US008817452B2

(12) United States Patent
Nguyen et al.

(10) Patent No.: US 8,817,452 B2
(45) Date of Patent: Aug. 26, 2014

(54) HIGH PERFORMANCE CARBON NANOTUBE ENERGY STORAGE DEVICE

(75) Inventors: Cattlien Van Nguyen, San Jose, CA (US); Darrell Lee Niemann, Santa Clara, CA (US)

(73) Assignee: Ultora, Inc., Sunnyvale, CA (US)

( * ) Notice: Subject to any disclaimer, the term of this patent is extended or adjusted under 35 U.S.C. 154(b) by 190 days.

(21) Appl. No.: 12/973,798

(22) Filed: Dec. 20, 2010

(65) Prior Publication Data

US 2011/0157770 A1 Jun. 30, 2011

Related U.S. Application Data

(60) Provisional application No. 61/288,788, filed on Dec. 21, 2009.

(51) Int. Cl.
*H01G 9/00* (2006.01)
*H01G 9/145* (2006.01)

(52) U.S. Cl.
USPC ............ 361/502; 361/503; 361/508; 977/842

(58) Field of Classification Search
USPC ................................... 361/500, 502, 503, 508
See application file for complete search history.

(56) References Cited

U.S. PATENT DOCUMENTS

| 6,454,816 | B1 * | 9/2002 | Lee et al. ..................... 29/25.03 |
| 6,972,056 | B1 * | 12/2005 | Delzeit et al. ..................... 134/1 |
| 2005/0238810 | A1 | 10/2005 | Scaringe et al. |
| 2006/0141153 | A1 | 6/2006 | Kubota et al. |
| 2006/0233692 | A1 | 10/2006 | Scaringe et al. |
| 2007/0258192 | A1 | 11/2007 | Schindall et al. |
| 2007/0279840 | A1 | 12/2007 | Jin et al. |
| 2008/0192407 | A1 | 8/2008 | Lu et al. |
| 2010/0178531 | A1 * | 7/2010 | Amaratunga et al. ............ 429/7 |
| 2010/0178568 | A1 * | 7/2010 | Unalan et al. ................. 429/317 |
| 2010/0216023 | A1 * | 8/2010 | Wei et al. ..................... 429/220 |

FOREIGN PATENT DOCUMENTS

JP 2005129566 5/2005

* cited by examiner

*Primary Examiner* — Jayprakash N Gandhi
*Assistant Examiner* — Dion R Ferguson

(57) ABSTRACT

Embodiments of the present invention are directed to an energy storage device and a method for manufacturing the energy storage device. The method includes accessing a metal substrate and forming plurality of carbon nanotubes (CNTs) directly on a metal substrate. The method further includes removing substantially all amorphous carbon from said plurality of CNTs and coupling the plurality of CNTs to an electrolytic separator.

15 Claims, 4 Drawing Sheets

HIGH PERFORMANCE CARBON NANOTUBE ENERGY STORAGE DEVICE

GOVERNMENT INTERESTS

The inventions described herein were made by non-government employees, whose contributions were made in performance of work under an Air Force contract, and is subject to the provisions of Public Law 96-517 (35 U.S.C. §202). These inventions were made with Government support under contract FA9453-09-M-0141 awarded by the Air Force. The Government has certain rights in these inventions.

RELATED APPLICATIONS

The present application claims the benefit of U.S. Provisional Patent Application No. 61/288,788, filed Dec. 21, 2009, entitled "CAPACITOR USING CARON NANOTUBE ELECTRODE," by Nguyen et al. That application is incorporated herein by reference in its entirety and for all purposes.

FIELD OF THE INVENTION

Embodiments of the present invention are generally related to carbon nanotubes (CNTs), electrodes, and energy storage.

BACKGROUND OF THE INVENTION

As technology has advanced, the need for energy to power technology has increased rapidly. The ability to store energy to power devices has also become increasingly important. One area of an increasing amount of research for energy storage is capacitors with carbon nanotubes (CNTs). The CNTs are typically grown with use of a metal catalyst layer. The metal catalyst layer is difficult to control during deposition. The metal catalyst layer adds to the cost to manufacturing of the capacitor. Unfortunately, the metal catalyst layer typically remains after the growing of the CNTs and negatively impacts performance.

The resistance of the interface between the CNTs and the metal is often the dominant component of resistance in a capacitor. CNTs grown with a metal catalyst layer which results in a high interface resistance due to the metal catalyst layer that remains. The high interface resistance thereby negatively impacts performance. In particular, the high resistance results in poor power performance of the capacitor.

Amorphous carbon also negatively impacts performance. The growth of CNTs using typical processes results in amorphous carbon. The amorphous carbon reduces the accessibility of pores of the CNTs which reduces the surface area thereby impacting performance of the CNTs.

SUMMARY OF THE INVENTION

Accordingly, a need exists to manufacture energy storage devices with reduced cost, reduced resistance, and better performance. Embodiments of the present invention provide an energy storage device (e.g., capacitor) with cheaper manufacturing and enhanced performance (e.g., low resistance). Embodiments of the present invention including directly growing carbon nanotubes (CNTs) on a metal substrate comprising a metal catalyst or coated with metal catalyst. The CNTs are grown directly on the metal substrate without depositing a catalyst layer. Amorphous carbon is removed from the CNTs thereby improving the performance of the energy storage device.

In one embodiment, the present invention is implemented as a method for forming a portion of an energy storage device. The method includes accessing a metal substrate and forming plurality of carbon nanotubes (CNTs) directly on a metal substrate. The metal substrate may comprise a metal catalyst or be coated with a catalyst. The plurality of CNTs may be grown directly on the metal substrate without a catalyst layer. The plurality of CNTs may be formed via chemical vapor deposition (CVD). In one embodiment, the plurality of CNTs is substantially vertically aligned. The method further includes removing amorphous carbon from the plurality of CNTs and coupling the plurality of CNTs to an electrolytic separator. In one embodiment, the amorphous carbon is removed via a process involving water.

In another embodiment, the present invention is implemented as a method of forming a capacitor. The method includes forming a first plurality of carbon nanotubes (CNTs) on a first metal substrate and removing amorphous carbon from the first plurality of carbon nanotubes (CNTs). The first plurality of CNTs may be grown on the first metal substrate without the addition of a catalyst layer. The first plurality of CNTs may be substantially vertically aligned. The method further includes forming a second plurality of carbon nanotubes (CNTs) on a second metal substrate and removing amorphous carbon from the second plurality of CNTs. In one embodiment, the first metal substrate and the second metal substrate comprise a metal catalyst. In another embodiment, the first metal substrate and the second metal substrate are coated with a metal catalyst. The first plurality of CNTs and the second plurality of CNTs may then be coupled to a membrane (e.g., electrolytic separator).

In yet another embodiment, the present invention is an energy storage device. The device includes a first metal substrate and a second metal substrate and an electrolytic separator. In one embodiment, the first metal substrate comprises a metal catalyst. In another embodiment, the first metal substrate is coated with a metal catalyst. The device further includes a plurality of carbon nanotubes (CNTs) coupled to the first metal substrate, the second metal substrate, and the electrolytic separator. The plurality of CNTs may be substantially vertically aligned. A first portion of the plurality of CNTs is grown directly on the first metal substrate and a second portion of the plurality of CNTs were grown directly on the second metal substrate. In one embodiment, the plurality of CNTs is grown directly on the first metal substrate without a catalyst layer. Amorphous carbon has been removed from the plurality of CNTs. The amorphous carbon may be removed by a process involving water.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Figure 3:
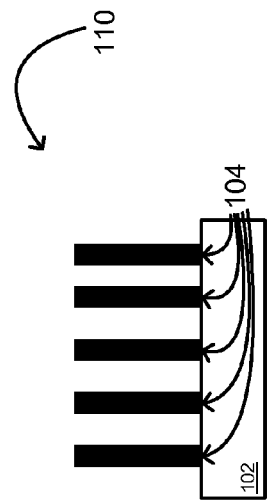
FIGS. 1-3 show diagrams of exemplary production stages of a portion of an energy storage device, in accordance with one embodiment of the present invention.
Figure 2:
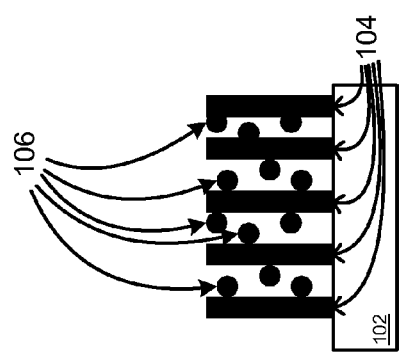
Figure 1A:
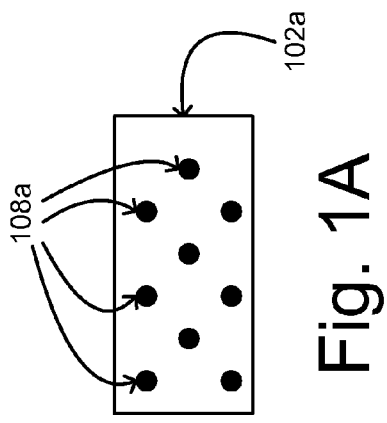

Exemplary Energy Storage Devices And Methods For Manufacturing Energy Storage Devices FIGS. 1-3 show diagrams of exemplary production stages of a portion of an energy storage device, in accordance with one embodiment of the present invention. Referring to FIG. 1A, a metal substrate 102a is selected. Metal substrate 102a may be metal alloy which may be a variety of alloys comprising a metal catalyst 108a including Fe, Ni, or Co or any other metal or combination of metals that have the capability to support growth of carbon nanotubes. An example is FeCrAl alloys, Kanthal (e.g., mainly iron, chromium (20-30%) and aluminium (4-7.5%)), Nichrome®, available from the Driver-Harris Company of Morristown, N.J. (e.g., 80% nickel and 20% chromium, by mass), or stainless steel.

Figure 1B:
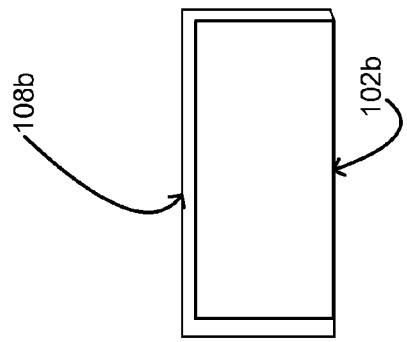

Referring to FIG. 1B, a metal substrate 102b is selected. Metal substrate 102b may be metal (e.g., Fe, Ni, Co, Al) or a metal foil (e.g., comprising Al and/or Cr). In one embodiment, metal substrate 102b may be coated or deposited (e.g., via a continuous process) with catalyst 108b.

Referring to FIG. 2, carbon nanotubes (CNTs) 104 are formed or grown directly on metal substrate 102. CNTs 104 are highly porous in structure and characterized by sizeable fraction of mesopores and high useable surface area. CNTs 104 are chemically stable and inert. CNTs 104 are electrically conductive. It is noted that metal substrate 102 of FIG. 2 comprises catalyst (e.g., catalyst 108a or catalyst 108b) which is not shown.

In one embodiment, CNTs 104 are grown with a thermal chemical vapor deposition (CVD) process. For example, the CVD process may be performed with hydrocarbons (e.g., ethylene, any $CH_x$ based hydrocarbon, or other carbon source) at a temperature greater than 600° C. and in an environment with reduced oxygen concentration. CNTs 104 are grown directly on the surface of metal substrate 102 without metal catalyst deposition. In one embodiment, CNTs 104 are multi-walled tower-like structures grown directly on metal substrate. In another embodiment, CNTs 104 are single-walled tower-like structures grown directly on metal substrate. In yet another embodiment, CNTs 104 are a combination of both single-walled and multi-walled tower-like structures grown directly on metal substrate.

The direct growth of CNTs 104 without using a catalyst layer removes the problems of high interface resistance and a catalyst layer which remains on the substrate. Embodiments of the present invention thus have no catalyst impurities impacting the interface resistance. Embodiments thus have minimal electrical resistance at the interface between the CNTs and the metal substrates thereby improving the performance of the energy storage device. The direct growth of the CNTs on the metal substrate further eliminates the need to use a binding material which reduces unnecessary weight of inactive materials.

In one embodiment, CNTs 104 are in a vertical alignment configuration. CNTs 104 may be in a variety of configurations including horizontal, random, disorder arrays, CNTs with other materials, or other alignments, etc. For example, CNTs 104 may be in a vertical tower structure (e.g., perpendicular to the metal surface). In another embodiment, the CNTs resemble a random network with a low degree of structural alignment in the vertical direction.

In one embodiment, a plasma-based treatment (e.g., via $O_2$ plasma) of the CNT towers is performed to impart hydrophilic character to the CNTs 104 for better wetting by an electrolyte. This allows more ions from the electrolytes to access the pores in of CNT electrodes which increases the charge density at the Helmholtz layer.

During the growth of CNTs 104, CNTs 104 may develop amorphous carbon 106. Amorphous carbon 106 occupies the spaces between CNTs 104 and thus render CNTs 104 less porous thereby impacting performance of CNTs 104 (e.g., as an electrode). In one embodiment, control of the growth temperature substantially reduces amorphous carbon impurities.

Referring to FIG. 3, a cleaning process is applied to CNTs 104 and amorphous carbon 106 is removed (e.g., partially or fully) from CNTs 104 thereby producing a portion of an energy storage device 110. In one embodiment, water vapor at high temperature is used to remove amorphous carbon 106 from CNTs 104. The cleaning process used may be a process described in U.S. Pat. No. 6,972,056 by Delzeit et al., which is incorporated herein by reference.

In one embodiment, a continuous water treatment process is used for purification of carbon nanotube collector electrodes for the removal of impurities including amorphous carbon. The process may include a wet inert carrier gas stream (e.g., Ar or $N_2$) and may include an additional dry carrier gas stream. The wet inert carrier gas stream and the additional dry carrier gas stream can be mixed to control the water concentration. Water may be added using a bubbler, membrane transfer system, or other water infusion method. Water vapor can be introduced in the process chamber at an elevated temperature in the range of 50-1100° C. The process chamber is at a temperature in the range of 50-1100° C. Water treatment increases the electrode porosity thereby increasing the accessibility of pores and allows use of CNTs in applications for high electrode surface area. The increased surface area increases the performance or enhances the capacitance of an energy storage device in accordance with embodiments of the present invention. For example, water treatment may result in an increase of specific capacitance values of about three times for water treated CNT electrodes.

Figure 6:
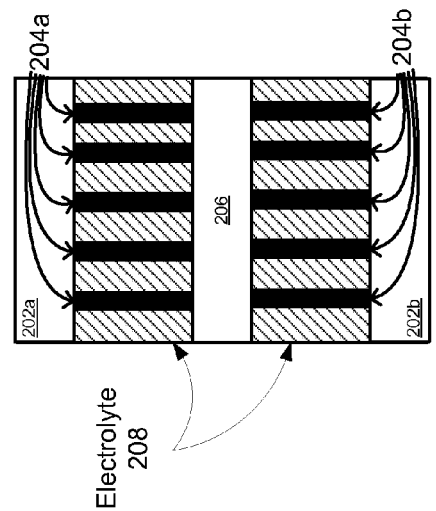
FIG. 4-6 show diagrams of exemplary production stages of an energy storage device, in accordance with one embodiment of the present invention.
Figure 5:
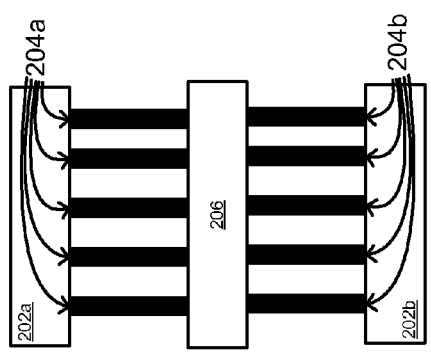
Figure 4:
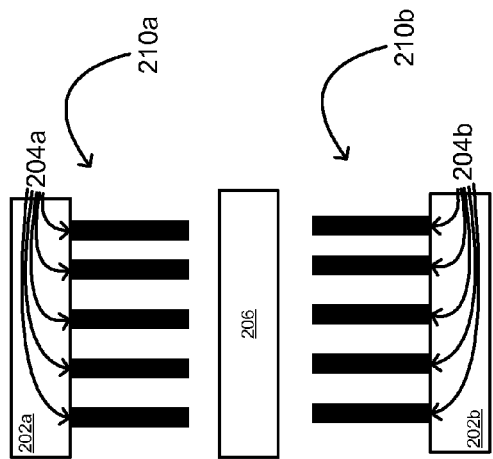

FIG. 4-6 show diagrams of exemplary production stages of an energy storage device, in accordance with one embodiment of the present invention. Referring to FIG. 4, two portions of an energy storage device 210a-b are formed (e.g., as described herein) and membrane 206 is selected. Portions of energy storage device 210a-b include metal substrates 202a-b and CNTs 204a-b. Metal substrates 202a-b may be coated with a catalyst or be a metal alloy comprising a metal catalyst. CNTs 204a-b have been grown directly on metal substrates 202a-b and have amorphous carbon removed. Membrane 206 may be a porous separator comprising a variety of materials including polypropylene, Nafion, Celgard or Celgard 3400 available from Celgard LLC of Charlotte, N.C.

Referring to FIG. 5, CNTs 204a-b are coupled to membrane 206. In one embodiment, CNTs 204a-b and metal substrates 202a-b are coupled to membrane 206 via a clamp assembly (e.g., clamp assembly 408).

Referring to FIG. 6, CNTs 204a-b may be submersed in electrolyte 208 which may be a liquid or gel or CNTs 204a-b may be surrounded by a specific gas, air, or vacuum. Electrolyte 208 can be a variety of electrolytes including aqueous electrolytes (e.g., Sodium sulphate ($Na_2SO_4$), Potassium hydroxide (KOH), Potassium chloride (KCl), Sulfuric acid ($H_2SO_4$), Magnesium chloride ($MgCl_2$), etc.), nonaqueous electrolyte solvents (e.g., Acetonitrile, Propylene carbonate, Tetrahydrofuran, Gamma-butyrolactone, Dimethoxyethane), and solvent free ionic liquids (e.g., 1-ethyl-3-methylimidazolium bis(pentafluoroethylsulfonyl) imide (EMIMBeTi), etc.).

Electrolyte 208 may include a variety of electrolyte salts used in solvents including Tetraalkylammonium salts (e.g., Tetraethylammonium tetrafluoroborate (($C_2H_5)_4NBF_4$), Methyltriethylammonium tetrafluoroborate (($C_2H_5)_3CH_3NBF_4$), Tetrabutylammonium tetrafluoroborate (($C_4H_9)_4NBF_4$), Tetraethylammonium hexafluorophosphate (($C_2H_5)NPF_6$)), Tetraalkylphosphonium salts (e.g., Tetraethylphosphonium tetrafluoroborate (($C_2H_5)_4PBF_4$), Tetrapropylphosphonium tetrafluoroborate (($C_3H_7)_4PBF_4$), Tetrabutylphosphonium tetrafluoroborate (($C_4H_9)_4PBF_4$)), and lithium salts (e.g., Lithium tetrafluoroborate (LiBF4), Lithium hexafluorophosphate (LiPF6), Lithium trifluoromethylsulfonate ($LiCF_3SO_3$)).

Figure 7:
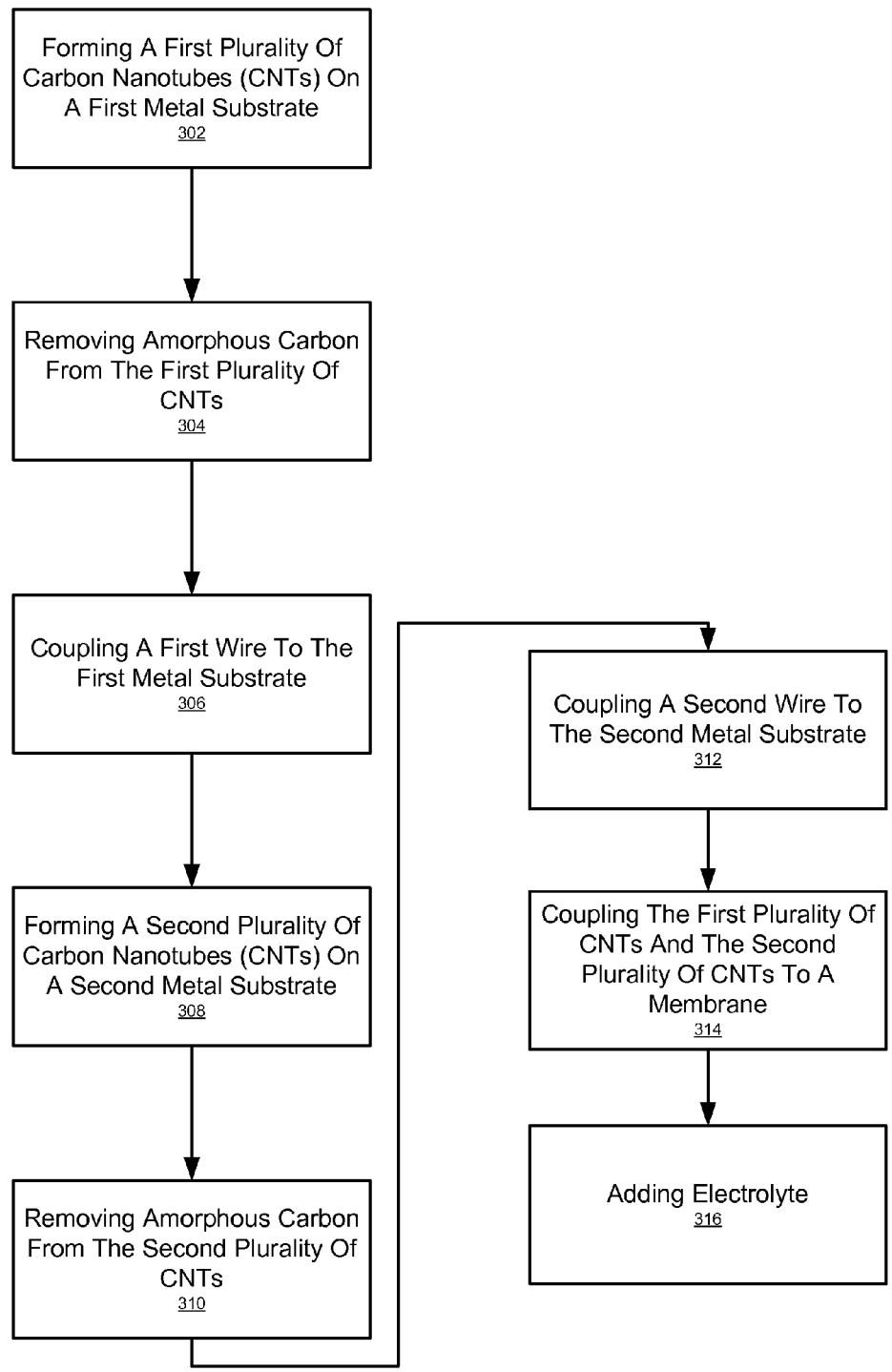
FIG. 7 shows an exemplary flowchart of a process for manufacturing an energy storage device, in accordance with embodiments of the present invention.

With reference to FIG. 7, exemplary flowchart 300 illustrates example computer controlled processes used by various embodiments of the present invention. Although specific blocks are disclosed in flowchart 300, such blocks are exemplary. That is, embodiments are well suited to performing various other blocks or variations of the blocks recited in flowchart 300. It is appreciated that the blocks in flowchart 300 may be performed in an order different than presented, and that not all of the blocks in flowchart 300 may be performed.

FIG. 7 shows an exemplary flowchart 300 of a process for manufacturing an energy storage device, in accordance with embodiments of the present invention. Process 300 may be operable for manufacturing an electrochemical double layer capacitor (EDLC).

At block 302, a first plurality of carbon nanotubes (CNTs) (e.g., CNTs 204a) are formed on a first metal substrate (e.g., metal substrate 202a). As described herein, the CNTs may be formed directly on the metal substrate.

At block 304, amorphous carbon is removed from the first plurality of CNTs. As described herein, the amorphous carbon may have been removed via a water treatment process. At block 306, a first wire is coupled to the first metal substrate.

At block 308, a second plurality of carbon nanotubes (CNTs) (e.g., CNTs 204b) are formed on a second metal substrate (e.g., metal substrate 202b). As described herein, the CNTs may be formed directly on the metal substrate.

At block 310, amorphous carbon is removed from the second plurality of CNTs. As described herein, the amorphous carbon may have been removed via a water treatment process. At block 312, a second wire is coupled to the second metal substrate.

At block 314, the first plurality of CNTs and the second plurality of CNTs are coupled to a membrane (e.g., electrolytic separator). At block 316, electrolyte is added. The electrolyte may be a variety of electrolytes, as described herein.

Figure 8:
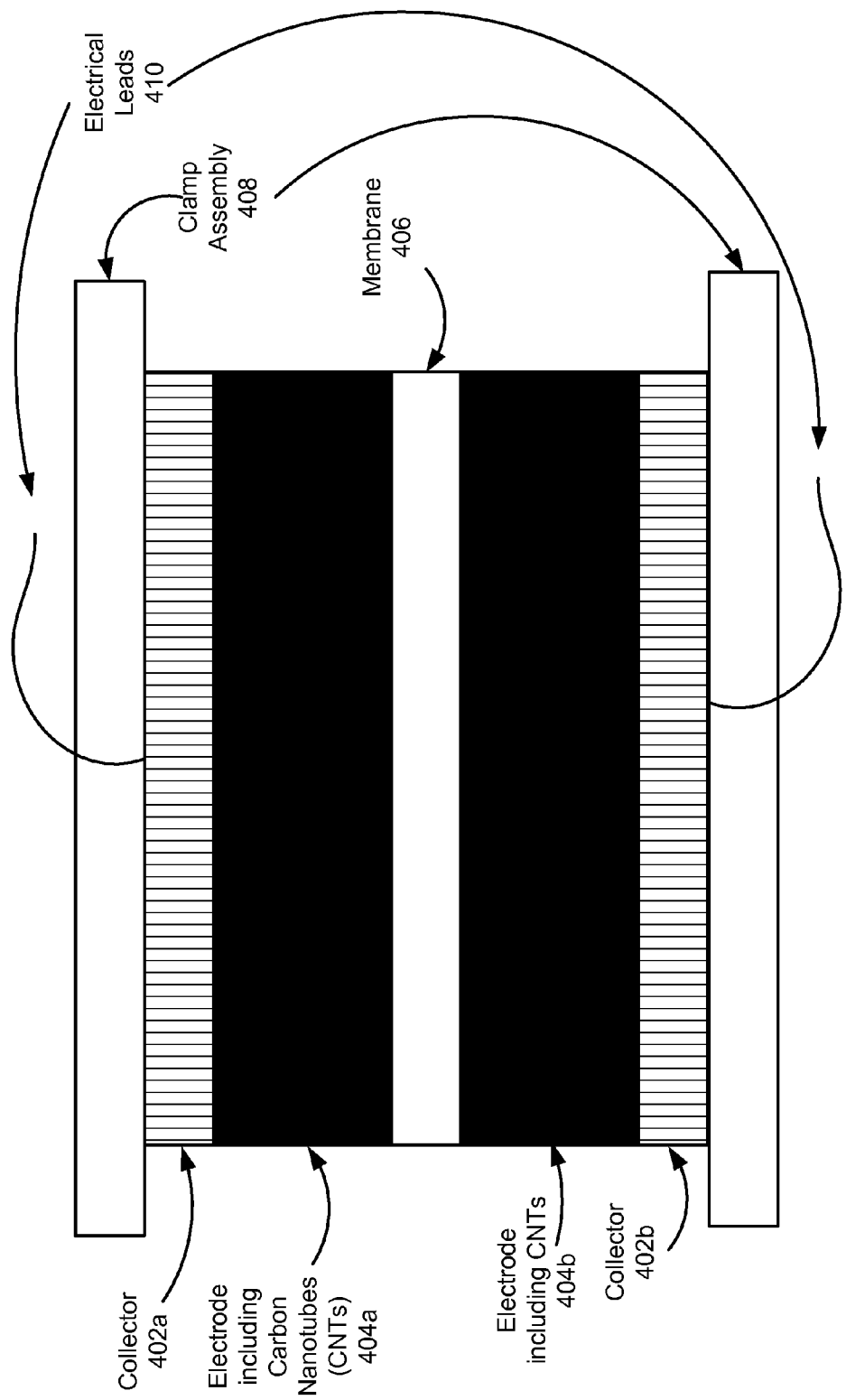
FIG. 8 shows a block diagram of an exemplary energy storage device, in accordance with one embodiment of the present invention.

FIG. 8 shows a block diagram of an exemplary energy storage device, in accordance with one embodiment of the present invention. In one embodiment, device assembly 400 may be an electrochemical double layer capacitor (EDLC). Device assembly 400 may have an operating voltage of 0.05V or greater. Embodiments of the present invention support fast charging time, high power delivery, and high energy density.

Device assembly 400 comprises two CNT electrodes 404a-b separated by an electrolytic membrane 406. In one embodiment, CNT electrodes 404a-b may be larger than 1×1 $cm^2$ area on a metal substrate or metal foil coated with a catalyst and can be manufactured in a roll-to-roll fashion. CNT electrodes 404a-b may be manufactured in any continuous processing of electrode materials. CNT electrodes 404a-b may be formed with or without water treatment and from substrates with or without an additional catalyst.

Electrical leads are attached to the assembly prior to affixing the clamp assembly 408. Electrical leads 410 (e.g., thin metal wires) contact the back of the collectors 402a-b (e.g., metal substrates 202a-b) to provide electrical contact. The device assembly 400 is then submerged in a container of electrolyte (e.g., electrolyte solution including solvated ions) (not shown), as described herein. Electrical leads 410 are fed out of the solution to facilitate capacitor operation.

Clamp assembly 408 holds electrodes 404a-b in close proximity while the electrolytic membrane 406 maintains an appropriate electrode separation and at the same time keeps the volume of device assembly 400 to a minimum. In one embodiment, clamp assembly 408 is a high-density assembly polyethylene (HDPE).

In one embodiment, device assembly 400 is a parallel plate capacitor with two vertically aligned multi-walled CNT tower electrodes 404a-b, an electrolytic membrane 406 (e.g., celgard or polypropylene, and using conventional aqueous electrolytes (e.g., 45% sulfuric acid or KOH).

Device assembly 400 may be operable for a variety of applications including replacement for batteries and other energy storage devices, consumer electronics (e.g., cellular telephones, cameras, computers, PDAs (personal digital assistants, smartphones, pagers, and charging devices), motor vehicles (e.g., for electric/hybrid vehicles, for capturing energy wasted during the operation of motor vehicles, such as braking, and for driving motors, lights, instrumentation, etc.), smart grids (e.g., for electricity delivery to homes, commercial buildings and factories), cold-starting assistance, catalytic converter preheating, delivery vans, golf carts, go-carts, uninterruptable power supplies (UPSs) for computers, standby power systems, copy machines (e.g., accelerating warm up mode and minimizing standby mode), car stereo amplifies, etc.

Thus, embodiments of the present invention provide an energy storage device (e.g., capacitor) with cheaper manufacturing and enhanced performance (e.g., low resistance). Embodiments of the present invention including directly growing carbon nanotubes (CNTs) on a metal substrate comprising a metal catalyst or coated with metal catalyst. The CNTs are grown directly on the metal substrate without depositing a catalyst layer. Amorphous carbon is removed from the CNTs thereby improving the performance of the energy storage device.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An energy storage device comprising:
   a first metal substrate and a second metal substrate, wherein said metal substrates are metal alloy foils comprised of chromium (Cr);
   an electrolytic separator;
   a plurality of carbon nanotubes (CNTs) coupled to said first metal substrate, said second metal substrate, and said electrolytic separator, wherein a first portion of said plurality of CNTs was grown directly on a surface of said first metal substrate and a second portion of said plurality of CNTs was grown directly on a surface of said second metal substrate wherein said surfaces of said first and second metal substrates do not comprise a deposited catalyst layer, wherein said first and second metal substrates comprise a metal catalyst and amorphous carbon has been removed from said plurality of CNTs, wherein said amorphous carbon is removed from said plurality of CNTs by a high temperature water process, wherein said high temperature water process comprises a wet inert carrier gas stream and an additional dry carrier gas stream mixed to control a water concentration.

2. The energy storage device of claim 1, wherein said metal catalyst comprises Fe, Co or Ni.

3. The energy storage device of claim 1 wherein said plurality of CNTs are grown at a temperature greater than 600° C.

4. The energy storage device of claim 1 wherein said plurality of CNTs are formed in a continuous process.

5. The energy storage device of claim 1 wherein said high temperature water process is greater than 600° C.

6. The energy storage device of claim 1 wherein said electrolytic separator comprises a material selected from the group consisting of polypropylene, Nafion, Celgard, and Celgard 3400.

7. The energy storage device of claim 1 further comprising:
   an electrolyte.

8. The energy storage device of claim 7 wherein said electrolyte is selected from the group consisting of aqueous electrolytes, nonaqueous electrolyte solvents, solvent free ionic liquids, Tetraalkylammonium salts, and lithium salts.

9. An energy storage device comprising:
   a first metal substrate and a second metal substrate, wherein said metal substrates comprise of aluminum (Al);
   an electrolytic separator;
   a plurality of carbon nanotubes (CNTs) coupled to said first metal substrate, said second metal substrate, and said electrolytic separator, wherein a first portion of said plurality of CNTs was grown directly on a surface of said first metal substrate and a second portion of said plurality of CNTs was grown directly on a surface of said second metal substrate wherein said surfaces of said first and second metal substrates do not comprise a deposited catalyst layer, wherein said first and second metal substrates comprise a metal catalyst, wherein said plurality of CNTs are grown at a temperature greater than 600° C. and amorphous carbon has been removed from said plurality of CNTs with a water vapor process, wherein said water vapor process comprises a wet inert carrier gas stream and an additional dry carrier gas stream mixed to control a water concentration.

10. The energy storage device of claim 9, wherein said metal catalyst comprises Fe, Co or Ni.

11. The energy storage device of claim 9 wherein said plurality of CNTs are formed in a continuous process.

12. The energy storage device of claim 9 wherein said electrolytic separator comprises a material selected from the group consisting of polypropylene, Nafion, Celgard, and Celgard 3400.

13. The energy storage device of claim 9 further comprising:
   an electrolyte.

14. The energy storage device of claim 13 wherein said electrolyte is selected from the group consisting of aqueous electrolytes, nonaqueous electrolyte solvents, solvent free ionic liquids, Tetraalkylammonium salts, and lithium salts.

15. The energy storage device of claim 9 wherein said water vapor process is greater than 600° C.

* * * * *